(12) United States Patent
Kim et al.

(10) Patent No.: US 9,428,624 B2
(45) Date of Patent: Aug. 30, 2016

(54) METHOD FOR MANUFACTURING A WIDE FILM, AND WIDE FILM

(75) Inventors: Hyukjun Kim, Daejeon (KR); Kwangjin Chung, Daejeon (KR); Cholho Lee, Daejeon (KR); Yooseock Hwang, Daejeon (KR); Juntae Choi, Daejeon (KR); Kinam Chung, Daejeon (KR)

(73) Assignee: SK INNOVATION CO., LTD. (KR)

( * ) Notice: Subject to any disclaimer, the term of this patent is extended or adjusted under 35 U.S.C. 154(b) by 1028 days.

(21) Appl. No.: 13/606,236

(22) Filed: Sep. 7, 2012

(65) Prior Publication Data

US 2013/0189508 A1 Jul. 25, 2013

Related U.S. Application Data

(63) Continuation-in-part of application No. 13/375,985, filed on Jan. 23, 2012, now Pat. No. 8,784,725.

(51) Int. Cl.
| | |
|---|---|
| *B28B 11/12* | (2006.01) |
| *C08J 5/18* | (2006.01) |
| *B29C 41/28* | (2006.01) |
| *B29C 55/08* | (2006.01) |
| *B29K 1/00* | (2006.01) |

(52) U.S. Cl.
CPC ............... *C08J 5/18* (2013.01); *B29C 41/28* (2013.01); *B29C 55/08* (2013.01); *B29K 2001/08* (2013.01); *C08J 2301/12* (2013.01)

(58) Field of Classification Search
USPC .......................................... 428/220; 264/146
See application file for complete search history.

(56) References Cited

U.S. PATENT DOCUMENTS

| | | | |
|---|---|---|---|
| 2004/0188007 A1* | 9/2004 | Buttel | B29C 65/7433 156/251 |
| 2007/0030417 A1 | 2/2007 | Kubo et al. | |

(Continued)

FOREIGN PATENT DOCUMENTS

| | | |
|---|---|---|
| JP | 09-207151 | 8/1997 |
| JP | 09207151 A * | 8/1997 |

(Continued)

OTHER PUBLICATIONS

Machine_English_Translation_JP_09207151_A; Ito, Nobuaki; Production of Film, Aug. 12, 1997; JPO; whole document.*

(Continued)

*Primary Examiner* — Tahseen N Khan
(74) *Attorney, Agent, or Firm* — Cantor Colburn LLP

(57) ABSTRACT

A method for manufacturing a wide film comprises a casting operation, a stretching operation, and a trimming operation. The casting operation is a process of casting a film using a wide casting belt including a central belt, a left belt having a right end formed integrally with a left end of the central belt through a left joint in a length direction of the central belt, and a right belt having a left end formed integrally with a right end of the central belt through a right joint in the length direction of the central belt. The stretching operation is a process of stretching a film stripped off from the wide casting belt using a tenter. The trimming operation is a process of trimming predetermined parts of left and right sides of the stretched film. In the trimming operation, mark parts by the left and right joints are also trimmed.

16 Claims, 17 Drawing Sheets

(56) References Cited

U.S. PATENT DOCUMENTS

2007/0108653 A1      5/2007  Nakamura
2008/0258335 A1     10/2008  Abiru
2009/0230576 A1*     9/2009  Nagashima ............. B29C 41/28
                                                             264/1.6

FOREIGN PATENT DOCUMENTS

| JP | 10244587 | 9/1998 |
|---|---|---|
| JP | 2002-254452 | 9/2002 |
| JP | 2007065184 | 3/2007 |
| KR | 10-2005-0027066 | 3/2005 |
| KR | 10-2008-0088522 | 10/2008 |
| KR | 10-2009-0110082 | 10/2009 |
| KR | 10-2010-0016615 | 2/2010 |
| WO | 2007125729 | 11/2007 |
| WO | WO2007125729 a1 * | 11/2007 |
| WO | 2008023502 | 2/2008 |

OTHER PUBLICATIONS

European Search Report—European Application No. 09845563.7 issued on Jun. 4, 2014, citing JP H09 207151, JP H10 244587, WO 2007/125729, US 2007/030417, JP 2007 065184 and WO 2008/023502.
International Search Report—PCT/KR2009/002966 dated Feb. 10, 2010.

* cited by examiner

METHOD FOR MANUFACTURING A WIDE FILM, AND WIDE FILM

CROSS REFERENCE TO RELATED APPLICATION

This is a continuation-in-part application of U.S. Ser. No. 13/375,985, filed on Dec. 2, 2011, the contents of which are hereby incorporated by reference in its entirety.

FIELD OF INVENTION

The present invention relates to a method for manufacturing a wide film and a wide film, and more particularly to a method for manufacturing a wide film using a wide casting belt and a wide film manufactured using the same.

BACKGROUND OF THE ART

A cellulose acylate film has high transparency and mechanical strength, and favorable dimensional stability with minimal dependency on humidity and temperature. Accordingly, this film is broadly used as a support for optical materials requiring such characteristics as described above. In general, the cellulose acylate film is manufactured by casting a dope containing a polymer dissolved in a solvent, over a non-discontinuous (that is, 'continuous') support.

A casting method may be classified into two types of methods that include a belt casting method and a drum casting method according to the kinds of continuous supports. The belt casting is a method wherein a dope is casted on a belt, a some of solvent is dried and stripped off (detached) and a film is transported to a post-stage operation, while the drum casting is a method wherein a dope is casted over a drum and stripped off with substantially little drying, and a film is transported to a post-stage operation.

The belt casting generally controls dry conditions and is useful for manufacturing a variety of films, while the drum casting may attain high speed casting, thus enabling mass production. Both of the foregoing methods have a disadvantage in that the continuous support, that is, the belt and the drum must be minutely surface-processed to produce a film having the clean surface required for a liquid display.

In order to minutely process the surface of the continuous support, both of the belt and the drum must undergo surface abrasion with high precision. For the belt, a belt made of stainless steel is fabricated through grinding and abrasion. The drum is fabricated by nickel plating and hard chromium plating using a carbon steel drum then abrasion thereof.

Although the drum does not create the problems described above, the belt must have a joint 11 formed to link both ends of the belt, thus forming a continuous support as shown in FIG. 1. Joint formation may be accomplished through welding and, in general, the welding method includes TIG welding, laser welding, etc. The welding may be conducted before or after abrasion. Since a welded part may remain on the belt after welding, the welded part should be clearly abraded even without encountering problems during film formation. However, the welded part cannot be completely removed, instead, is visibly distinguishable. Accordingly, when a polarizer or an optical compensation film is manufactured using the prepared cellulose acylate, some products may be used after cutting out a welding line therefrom.

In recent years, as a liquid crystal display tends to be increased in a size, widths of a polarizer and an optical compensation film are increased corresponding to the increase in size described above. Accordingly, in order to increase a width and a product yield in manufacturing polarizer and optical compensation films, there are needs for development of an improved cellulose acylate film and for widening thereof.

The drum may be fabricated into a drum having a width of 2030 mm or more, in turn enabling production of a wide film. On the other hand, it is known that the belt production is limited to a belt having a maximum width of 2030 mm. Therefore, referring to FIG. 2, in order to fabricate a belt having a width of 2030 mm or more, two different belts may be welded in a length direction. However, since a central joint Cc is formed through welding between a first belt 10 and a second belt 20, the prepared film has a mark caused by the central joint Cc, in turn encountering difficulty in the use thereof.

The casted dope on the belt is stripped off and formed into a film by a tenter and a drier. The film is slightly shrunk in a width direction after casting to a stripping operation, and optionally subjected to stretching in the tenter. In a drying process using the drier, the film does not show high numerical variation. In order to smoothly transport a normal film and maintain overall characteristics of the film, a trimming process of cutting both ends of the film is adopted wherein the trimming process is performed at one or two sites after casting, tenter processing, drying, etc.

Accordingly, considering a belt with a width of 2030 mm, a width of a film to be manufactured is 2.03 m or less. Further, in consideration of stability in casting, stretching by the tenter and removal of both ends of the film, a maximum width obtained may be 1800 mm or less, thus entailing difficulty in manufacturing a film to be in accordance with the current widening trend.

SUMMARY

Technical Problem

An object of the present invention is to provide a method for manufacturing a wide film using a wide casting belt without generating a mark part at the central part due to belt welding.

Another object of the present invention is to provide a wide film manufactured using a wide casting belt without generating a mark part at the central part due to belt welding.

Technical Solution

In one general aspect, a method for manufacturing a wide film, includes: a casting operation which is a process of casting a film using a wide casting belt including a central belt, a left belt having a right end formed integrally with a left end of the central belt through a left joint in a length direction of the central belt, and a right belt having a left end formed integrally with a right end of the central belt through a right joint in the length direction of the central belt; a stretching operation which is a process of stretching a film stripped off from the wide casting belt using a tenter; a trimming operation which is a process of trimming predetermined parts of left and right sides of the stretched film; and a winding operation which is a process of winding the film, wherein in the trimming operation, mark parts by the left and right joints are also trimmed.

The method for manufacturing a wide film may further include a drying operation which is a process of drying the stretched film, wherein the trimming operation includes: a first trimming operation which is a process of simultaneously trimming mark parts by the left joint and right joint of the stretched film between the stretching operation and the drying operation; a second trimming operation which is a process of trimming predetermined parts of left and right sides of the dried film after the drying operation; and a winding operation which is a process of winding a film.

The method for manufacturing a wide film may further include a drying operation which is a process of drying the stretched film, wherein the trimming operation includes: a first trimming operation which is a process of trimming predetermined parts of left and right sides of the stretched film between the stretching operation and the drying operation; and a second trimming operation which is a process of simultaneously trimming mark parts by the left joint and right joint of the dried film after the drying operation.

In the casting operation, dope containing cellulose triacetate solution may be used, the dope may include a solvent such as methylene chloride and methanol and a plasticizer, other than the cellulose triacetate, and the dope may have a solid content comprising the cellulose triacetate and the plasticizer of 15 to 25 wt. %, and a mixing ratio of the solvents, that is, methylene chloride and methanol may range from 80 to 95 wt. % and 5 to 20 wt. %, respectively, while the plasticizer may be contained in an amount of 5 to 20 wt. %, based on 100 wt. % of the cellulose triacetate.

In another general aspect, a method for manufacturing a wide film includes: a casting operation which is a process of casting a film using a wide casting belt including a central belt, a left belt having a right end formed integrally with a left end of the central belt through a left joint in a length direction of the central belt, and a right belt having a left end formed integrally with a right end of the central belt through a right joint in the length direction of the central belt; a stretching operation which is a process of stretching a film stripped off from the wide casting belt using a tenter; an anti-slipping marking operation which is a process of forming anti-slipping mark parts at the mark parts by the left joint and the right joint; and a winding operation which is a process of winding a film having anti-slipping mark parts formed therein.

The method for manufacturing a wide film may further include a drying operation which is a process of drying the stretched film, wherein the anti-slipping marking operation includes: a first anti-slipping marking operation which is a process of forming anti-slipping mark parts at predetermined parts of left and right sides of the stretched film, that is, the mark parts by the left joint and the right joint, between the stretching operation and the drying operation; and a second anti-slipping marking operation which is a process of forming anti-slipping mark parts at predetermined parts of left and right sides of the dried film after the drying operation.

The method for manufacturing a wide film may further include: a first trimming operation which is a process of trimming predetermined parts of the left and right sides between the stretching operation and the first anti-slipping marking operation; and a second trimming operation which is a process of trimming predetermined parts of the left and right sides of the dried film after the drying operation.

The method for manufacturing a wide film may further include a drying operation which is a process of drying the stretched film, wherein the anti-slipping marking operation includes: a first anti-slipping marking operation which is a process of forming anti-slipping mark parts at predetermined parts of left and right sides of the stretched film between the stretching operation and the drying operation; and a second anti-slipping marking operation which is a process of forming anti-slipping mark parts at predetermined parts of the left and right sides of the dried film, that is, the mark parts by the left joint and the right joint, after the drying operation.

The method for manufacturing a wide film may further include: a first trimming operation which is a process of trimming predetermined parts of the left and right sides between the stretching operation and the first anti-slipping marking operation; and a second trimming operation which is a process of trimming predetermined parts of the left and right sides of the dried film after the drying operation.

In the wide casting belt, the central belt may have a width of 1200 to 1500 mm, and the left and right belts may have a width of 300 to 500 mm.

In the wide casting belt, a central belt joint connecting the central belt to each other, a left belt joint connecting the left belt to each other, and a right belt joint connecting the right belt to each other may be positioned on the same straight line.

The left joint, the right joint, the central belt joint, the left belt joint, and the right belt joint may be formed by welding.

In still another general aspect, a wide film manufactured by the method described above is provided.

The wide film may have a portion manufactured by being casted between the left joint and the right joint and having a width of 1500 mm or more.

In the casting operation, dope containing cellulose triacetate may be used, the dope may include a solvent such as methylene chloride and methanol and a plasticizer, other than the cellulose triacetate, and the dope may have a solid content comprising the cellulose triacetate and the plasticizer of 15 to 25 wt. %, and a mixing ratio of the solvents, that is, methylene chloride and methanol may range from 80 to 95 wt. % and 5 to 20 wt. %, respectively, while the plasticizer may be contained in an amount of 5 to 20 wt. %, based on 100 wt. % of the cellulose triacetate.

In the wide casting belt, the central belt may have a width of 1200 to 1500 mm, and the left and right belts may have a width of 300 to 500 mm.

In the wide casting belt, a central belt joint connecting the central belt to each other, a left belt joint connecting the left belt to each other, and a right belt joint connecting the right belt to each other may be positioned on the same straight line.

The left joint, the right joint, the central belt joint, the left belt joint, and the right belt joint may be formed by welding.

In still another general aspect, a wide film manufactured by the method described above is provided.

The wide film may have a portion manufactured by being casted between the left joint and the right joint and having a width of 1500 mm or more.

Advantageous Effects

According to the present invention, a wide film may be manufactured without generating a mark part caused by casting belt welding.

In addition, according to the present invention, since the wide film may be manufactured even without increasing a stretching rate of the film in a stretching operation, a film having a desired width may be easily manufactured while satisfying requirements of a film in respect to intrafacial retardation, facial retardation and film thickness.

DETAILED DESCRIPTION OF EMBODIMENTS

A method for manufacturing a wide film and a wide belt according to the exemplary embodiment of the present invention will be described in more detail with reference to accompanying drawings.

The method for manufacturing a wide film according to the present invention is a method capable of manufacturing a film so that marks F21 and F22 by left and right joint Cl and Cr do not remain and may be performed by removing a predetermined region In addition, the removal of the mark may be preformed by various processes during manufacturing of a wide film F.

In the following first to eighth embodiments 1 to 8, which are embodiments for explaining in detail how the mark removing operation may be performed by a specific process in the process of manufacturing a wide film F, the process of the manufacturing a wide film may be sequentially described in detail However, the method for manufacturing a wide film according to the present invention is not limited to the embodiment including the following sequential process, but may be performed by a combination of more various processes and the mark removing operation may be also performed by other process operations.

Figure 1:
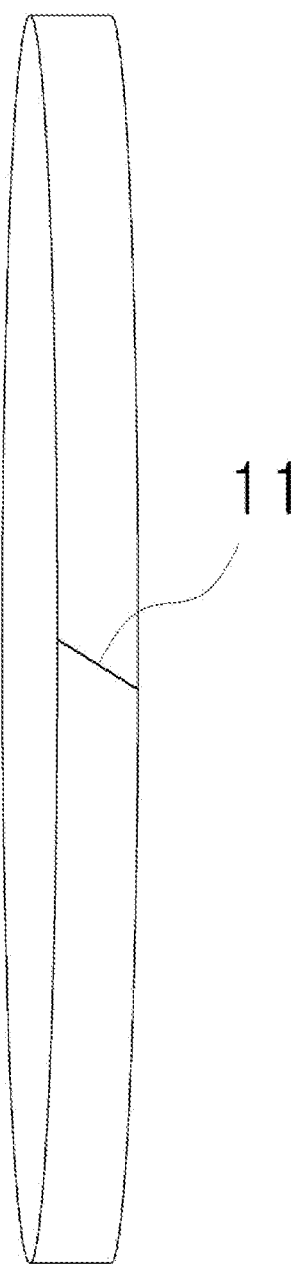
FIGS. 1 and 2 are perspective views showing a casting belt according to the related art.
Figure 2:
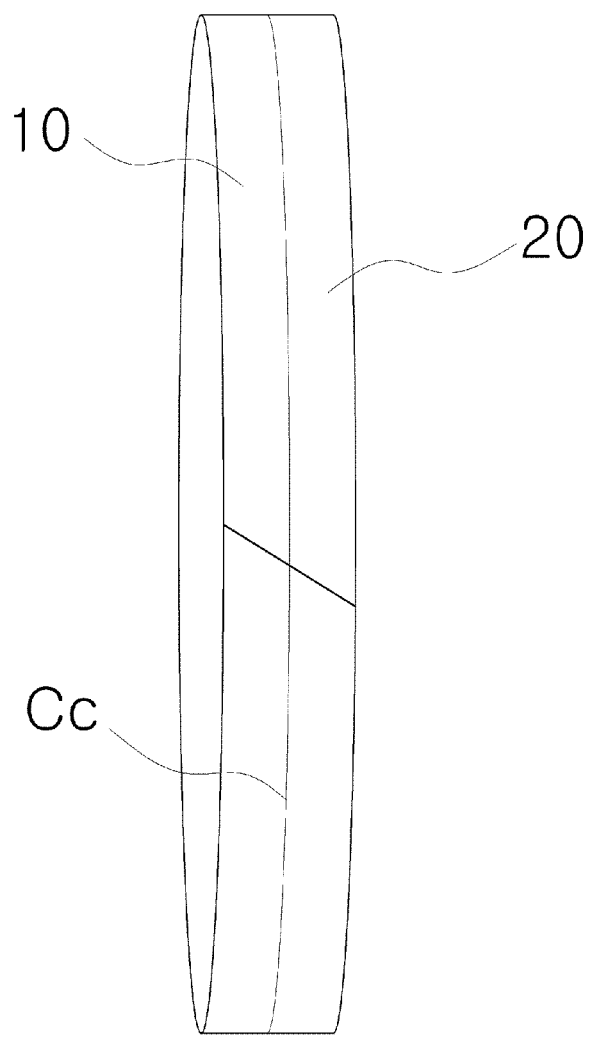
Figure 3:
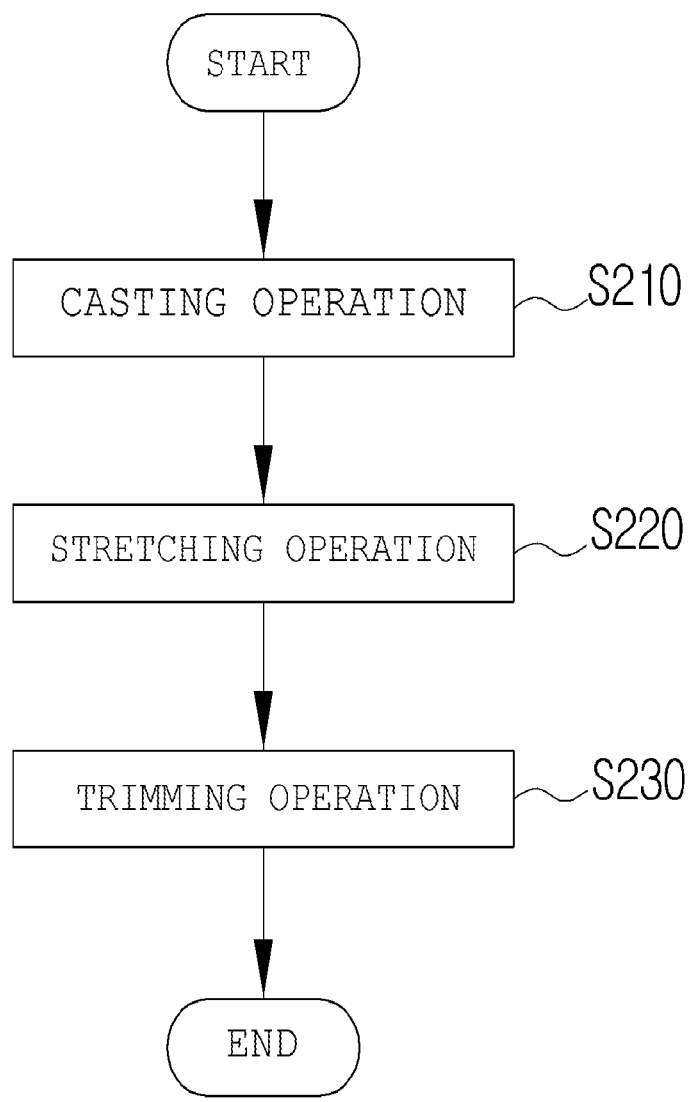
FIG. 3 is a flow chart of a first embodiment according to the present invention.
Figure 4:
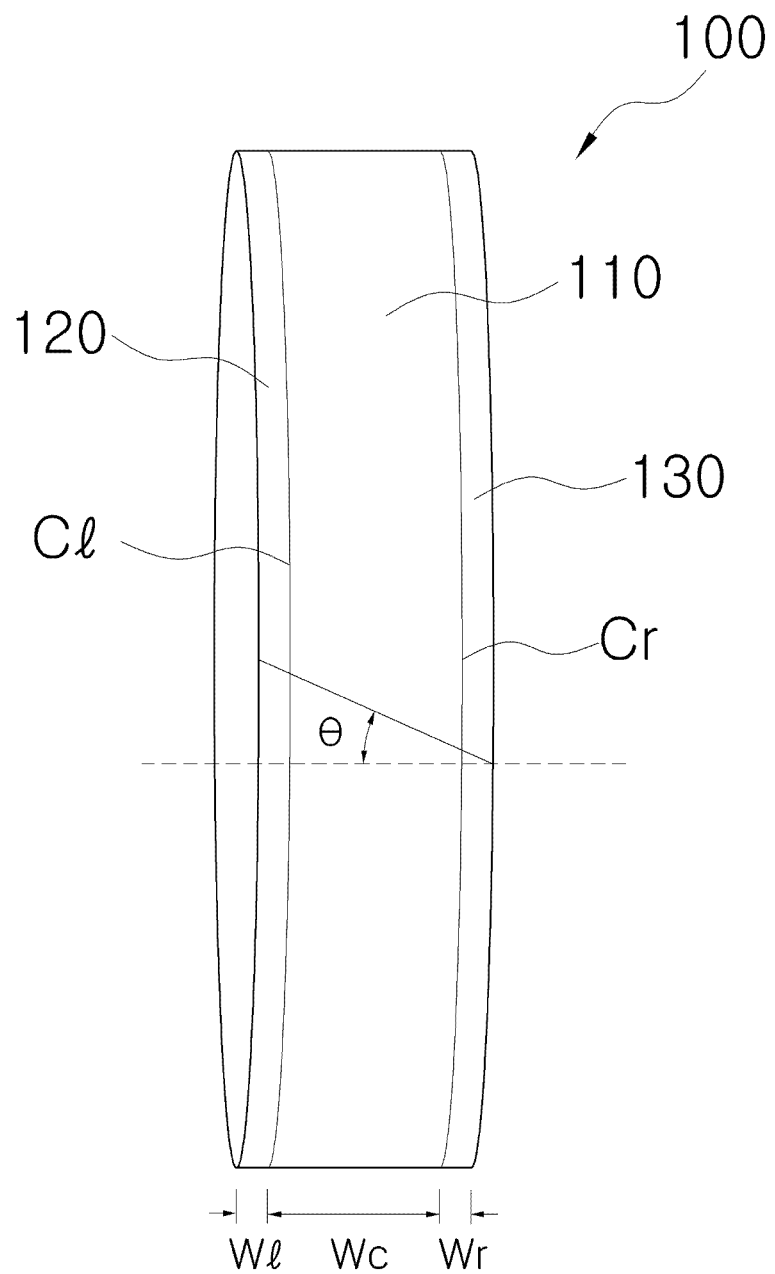
FIGS. 4 and 5 are a perspective view and an exploded perspective view showing a wide casting belt used in a casting operation according to the present invention, respectively.
Figure 5:
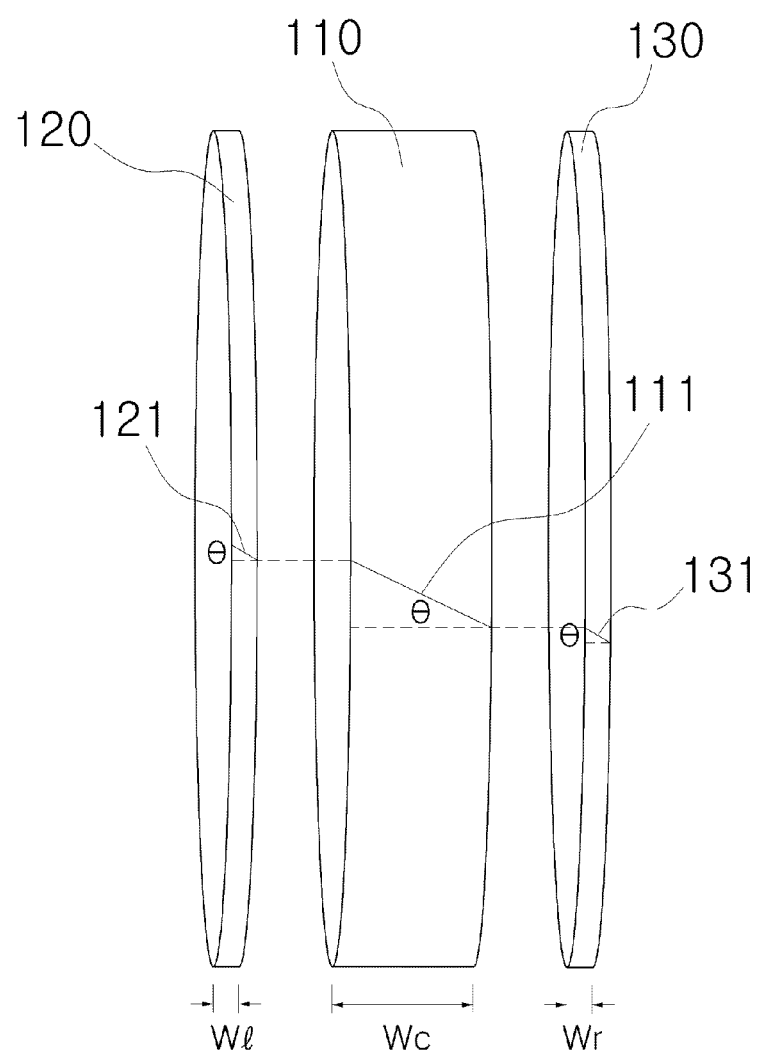

FIG. 3 is a flow chart of a first embodiment according to the present invention, and FIGS. 4 and 5 are a perspective view and an exploded perspective view showing a wide casting belt 100 used in a casting operation (S210) according to the present invention, respectively.

According to the first embodiment of the present invention, the method for manufacturing a wide film includes a casting operation (S210), a stretching operation (S220), and a trimming operation (S230).

The casting operation (S210) is a process of forming film using a wide casting belt 100.

Here, in the casting operation (S210), a dope containing a polymer solution is used and the dope may contain cellulose triacetate solution.

More specifically, the dope may have solid content comprising of cellulose triacetate and a plasticizer ranging from 15 to 25 wt. %, while a solvent is a mixed solution of methylene chloride and methanol. A mixing ratio of methylene chloride and methanol may range from 80:20 to 95:5, that is, a ratio by weight. Additionally, 5 to 20 wt. % of the plasticizer, 0.5 to 2 wt. % of a UV protector, 0.1 to 1 wt. % of an anti-slipping agent, $0.1 \times 10^{-4}$ to $100 \times 10^{-4}$ wt. % of a dye, etc., may be included based on to 100 wt. % of cellulose triacetate.

The wide casting belt 100 used in the casting operation (S210) includes a central belt 110, a left belt 120 and a right belt 130 (See FIGS. 4 and 5).

The left belt 120 has a right end formed integrally with a left end of the central belt through a left joint Cl in a length direction of the central belt 110.

The right belt 130 has a left end formed integrally with a right end of the central belt through a right joint Cr in the length direction of the central belt 110.

That is, the left, central, and right belts 120, 110, and 130 form the left and right joints Cl and Cr in the length direction of the central belt, thereby forming a single wide casting belt 100.

Here, the wide casting belt 100 may be formed so that the central belt has a width Wc of 1200 to 1500 mm and the left and right belts have a width Wr of 300 to 500 mm.

Therefore, the film manufactured by the method for manufacturing a wide film according to the present invention is formed so that the central belt has the width Wc wider than the width W1 of the left belt and the width Wr of the right belt, such that a middle region in a width direction of the wide casting belt 100 is supported by the central belt 110, thereby making it possible to easily manufacture the wide film and to solve the problem that the mark remains at the central region in a width direction of the film in the related art.

The central belt 110 has a central belt joint 111 welded so as to form a continuous belt.

The central belt joint 111 is a transverse joint connecting upper and lower ends of the central belt 110, to form a continuous belt.

The central belt joint 111 may be formed by welding, wherein the welding may be TIG welding or laser welding.

here, the central belt joint 111 is a portion forming the middle region of the wide film F and may be formed so as to prevent marks from remaining due to the central belt joint 111, which may be performed by high quality surface abrasion.

The left belt 120 and the right belt 130 have respectively a left belt joint 121 and a right belt joint 131.

Each of the left belt joint 121 and the right belt joint 131 may be a transverse joint similar to the central belt joint 111.

Since both of the left belt joint 121 and the right belt joint 131 form left and right regions of the wide belt or are regions partially (or entirely) removed, both of the left belt joint 121 and the right belt joint 131 need not have high quality surface abrasion as compared to the central belt joint 111.

The central belt joint 111, the left belt joint 121, and the right belt joint 131 may be disposed on the same line. The case in which the central belt joint 111, the left belt joint 121, and the right belt joint 131 may be formed to have a predetermined angle (θ) with respect to a transverse face of the central belt 110 is shown by way of example in FIGS. 4 and 5.

In this case, the predetermined angle (θ) between the central belt joint 111 and the transverse face of the central belt 110, the left belt joint 121 and the transverse face, and the right belt joint 131 and the transverse face may be in a range of 0° to 25°.

In the stretching operation S220 which is a process of using a tenter 300 to stretch the film F220 after the casting operation (S210), a film stripped from the wide casting belt 100 is stretched.

In the stretching operation S220, left and right predetermined regions of the casted film in a gel type are gripped by a pin (not shown) of the tenter 300 or a clip (not shown) of the tenter 300, and a length thereof in a width direction extends at a predetermined rate.

When a width of the gel type film stripped off from the wide casting belt 100 is CW and a width of the film resulted from the stretching operation is TW, the CW may be 1300 mm and CW×0.9=TW=CW×1.3.

The trimming operation (S230) is a process of removing predetermined parts of the left and right sides of the stretched film.

In this trimming operation of the method for manufacturing a wide film according to the exemplary embodiment of the present invention, mark parts by the left and right belt joints are also simultaneously removed.

Therefore, in the method for manufacturing a wide film according to the exemplary embodiment of the present invention, mark parts by the left joint and right joint may not remain in the wide film.

The second embodiment relates to another example of a method for a wide film according to the present invention.

Figure 6:
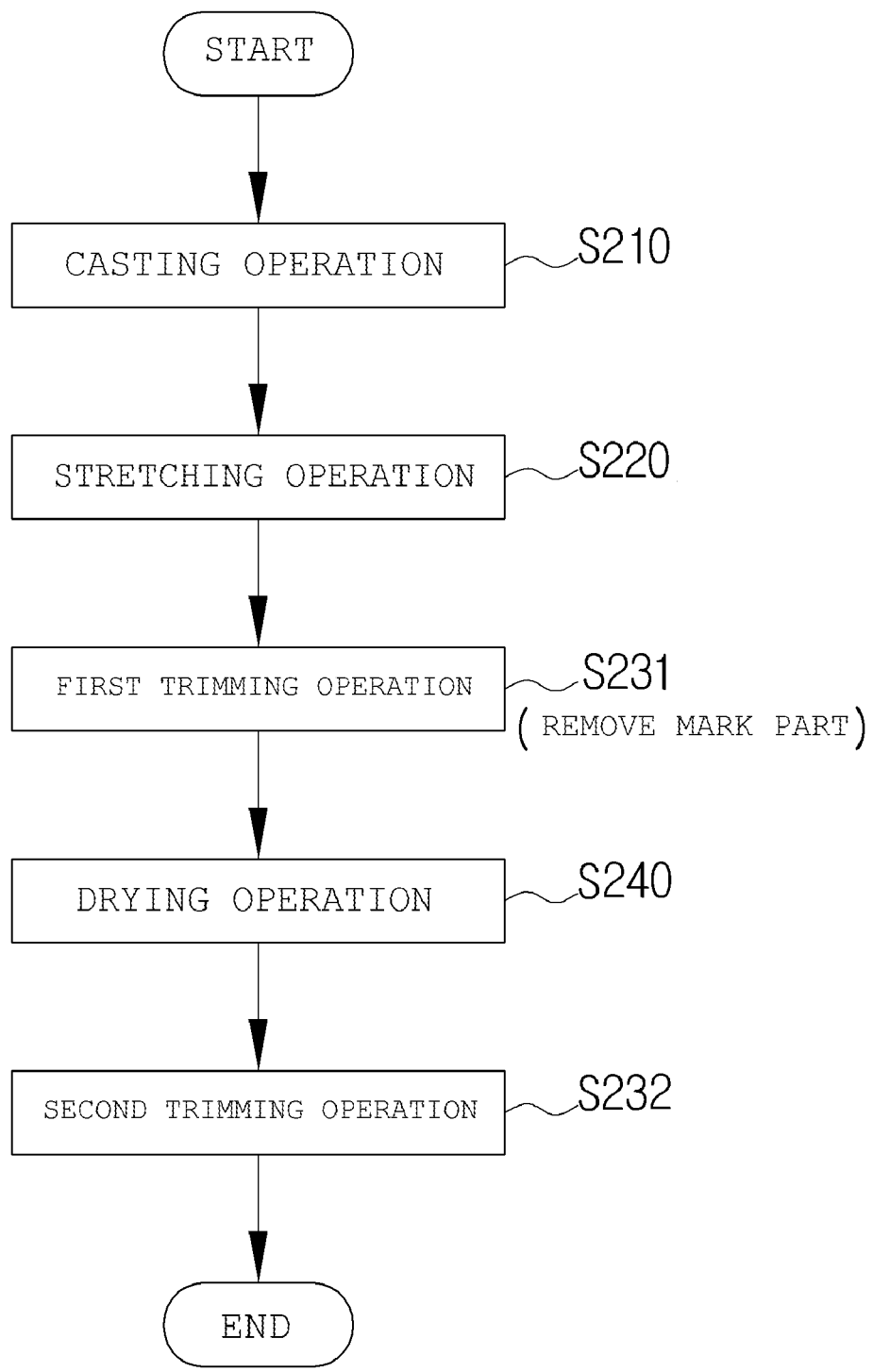
FIG. 6 is a flow chart of a second embodiment of the present invention.

The method for manufacturing a wide film according to the second embodiment of the present invention further includes a drying operation (S240) as compared to the first embodiment of the present invention. Here, the case in which trimming operations (S230) includes a first trimming operation (S231) performed between a stretching operation (S220) and the drying operation (S240) and a second trimming operation (S232) performed after the drying operation (S240) is described (See FIG. 6).

In the second embodiment of the present invention, an example of removal of a mark through the first trimming operation (S231) is described.

The casting operation (S210) is the same operation as that in the first embodiment, and a description thereof will be omitted.

The drying operation (S240) may be performed after the stretching operation (S220).

The first trimming operation (S231) is a process of trimming predetermined parts of left and right sides of a film.

At this time, in the first trimming operation (S231), a mark removing operation may be performed so that the trimmed parts of the left and right sides of the film include regions at which marks F21 and F22 are formed by a left joint Cl and a right joint Cr.

Figure 7:
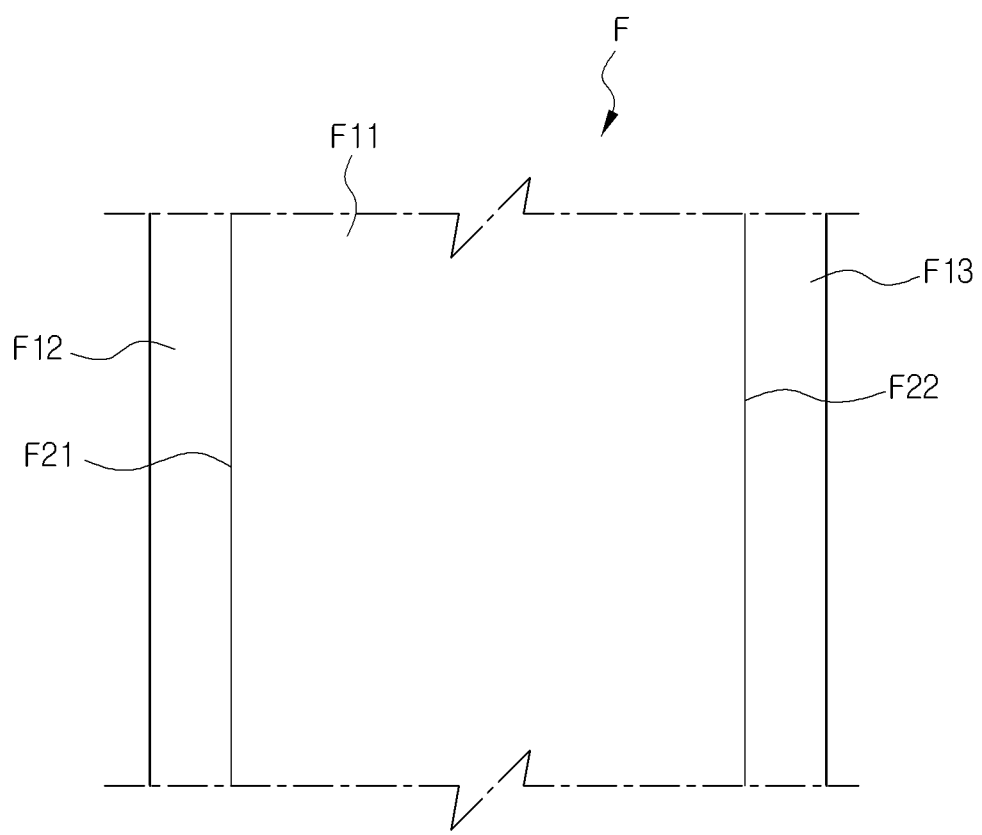
FIG. 7 is a schematic view of a film obtained from a casting operation according to the present invention.
Figure 8:
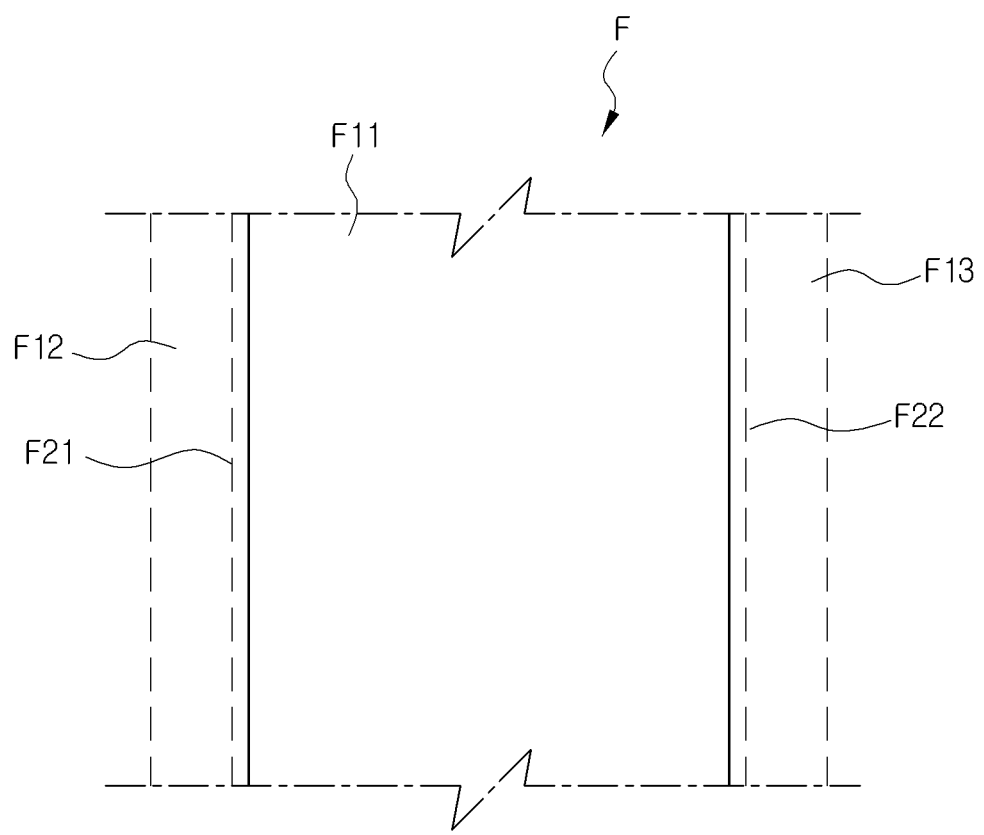
FIG. 8 is a schematic view of a film obtained from a first trimming operation according to the present invention.

FIG. 7 shows a state of a film obtained from the casting operation (S210) or the stretching operation (S220), and FIG. 8 shows a state of a film obtained from a first trimming operation (S231).

In FIGS. 7, 8, 16, and 17 that are views showing a state of a film in the corresponding operation, respectively, a film region formed by the central belt is indicated as reference numeral F11, a film region formed by the left belt is indicated as reference numeral F12, and a film region formed by the right belt is indicated as a reference numeral F11, respectively.

A width of the film F obtained from the casting operation (S210) may be changed according to the operation.

That is, the first trimming operation (S231) is performed after the stretching operation (S220), such that regions at which marks F21 and F22 are formed by a left joint Cl and a right joint Cr are trimmed together with a part gripped by the tender 300. Therefore, the regions at which marks F21 and F22 are formed by a left joint Cl and a right joint Cr do not remain with a final wide film F.

In addition, the second trimming operation (S232), which is a process of trimming predetermined parts of the left and right sides similarly to the first trimming operation, is performed after the drying operation (S240).

Figure 9:
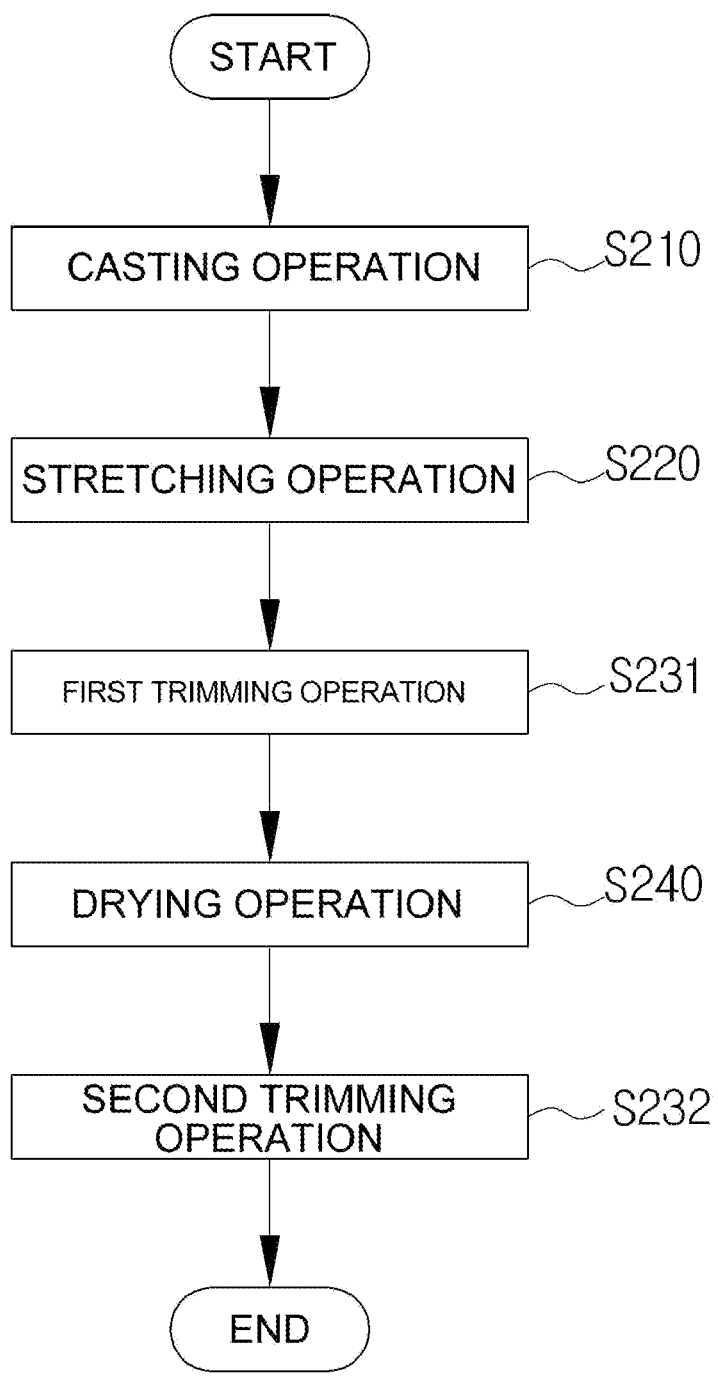
FIG. 9 is a flow chart of a third exemplary embodiment of the present invention.

The third embodiment relates to another example of a method for manufacturing a wide film according to the present invention (See FIG. 9).

Here, the method for manufacturing a wide film according to the third embodiment of the present invention is the same as that of the second embodiment of the present invention including the casting operation (S210), the stretching operation (S220), the drying operation (S240), and the trimming operation (S230) (the first trimming operation (S231) and the second trimming operation (S232)). Therefore, a description thereof will be omitted.

However, in the third embodiment, the case in which the marks are trimmed in the second trimming operation (S231) so that the trimmed parts of the left and right sides of the film include regions at which marks F21 and F22 are formed by a left joint Cl and a right joint Cr is described.

Although not shown, in a method for manufacturing a wide film according to another embodiment of the present invention, a second trimming operation (S232) may be performed immediately after a stretching operation (S220) and a first trimming operation (S231). In this case, marks F21 and F22 formed by a left joint Cl and a right joint Cr may be trimmed in at least one of the first and second trimming operations (S231 and S232).

A method for manufacturing a wide film according to a fourth embodiment of the present invention includes a casting operation (S210), a stretching operation (S220), and an anti-slipping marking operation (S250).

The casting operation (S210) and the stretch operation (S220) are the same operations as those in the first embodiment, and a description thereof will be omitted.

The anti-slipping marking operation (S250) is a process of marking predetermined parts of left and right sides of a film to form an anti-slipping part F30.

The anti-slipping mark part F30 may be formed by a general marking press 700.

In this case, the anti-slipping mark part F30 is formed to include regions at which marks F21 and F22 are formed by a left joint Cl and a right joint Cr, such that the marks F21 and F22 formed by a left joint Cl and a right joint Cr do not remain in the final film.

In the case in which the anti-slipping mark part F30 includes the marks F21 and F22 formed by a left joint Cl and a right joint Cr, it is possible to minimize reduction of a width of the film in the manufacturing process of the wide film F, such that the wide film F may easily manufactured.

Figure 11:
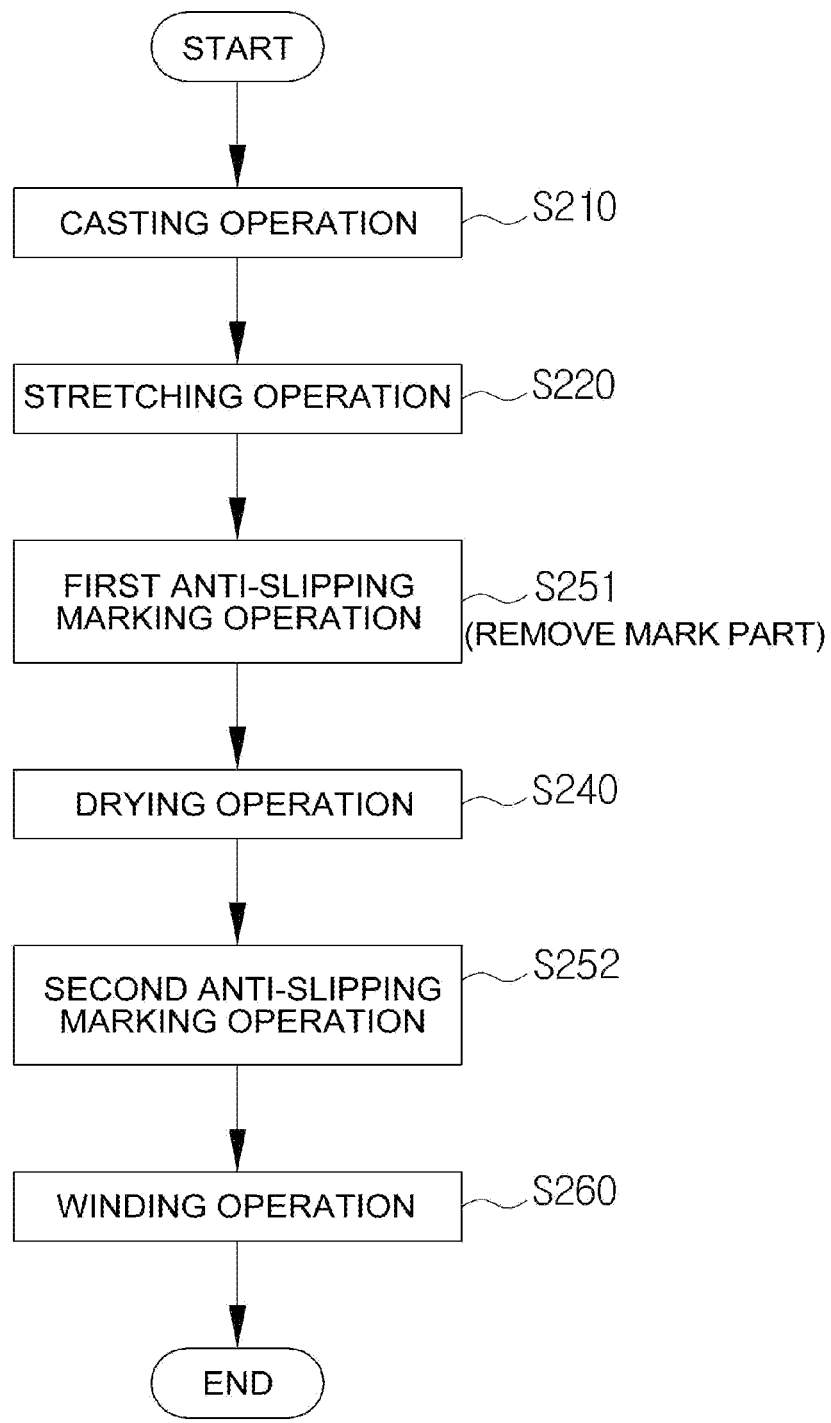
FIG. 11 is a flow chart of a fifth exemplary embodiment of the present invention.

The fifth embodiment relates to another example of a method for manufacturing a wide film according to the present invention (See FIG. 11).

A casting operation (S210), and a stretch operation (S220), and a dry operation (S240) are the same operations as those in the second embodiment, and a description thereof will be omitted. The method for manufacturing a wide film according to the fifth embodiment of the present invention further include a winding operation (S260), and an anti-slipping marking operation (S250) includes a first anti-slipping marking operation (S251) and a second anti-slipping marking operation (S252).

The winding operation (S260) is a process of winding a film.

Figure 10:
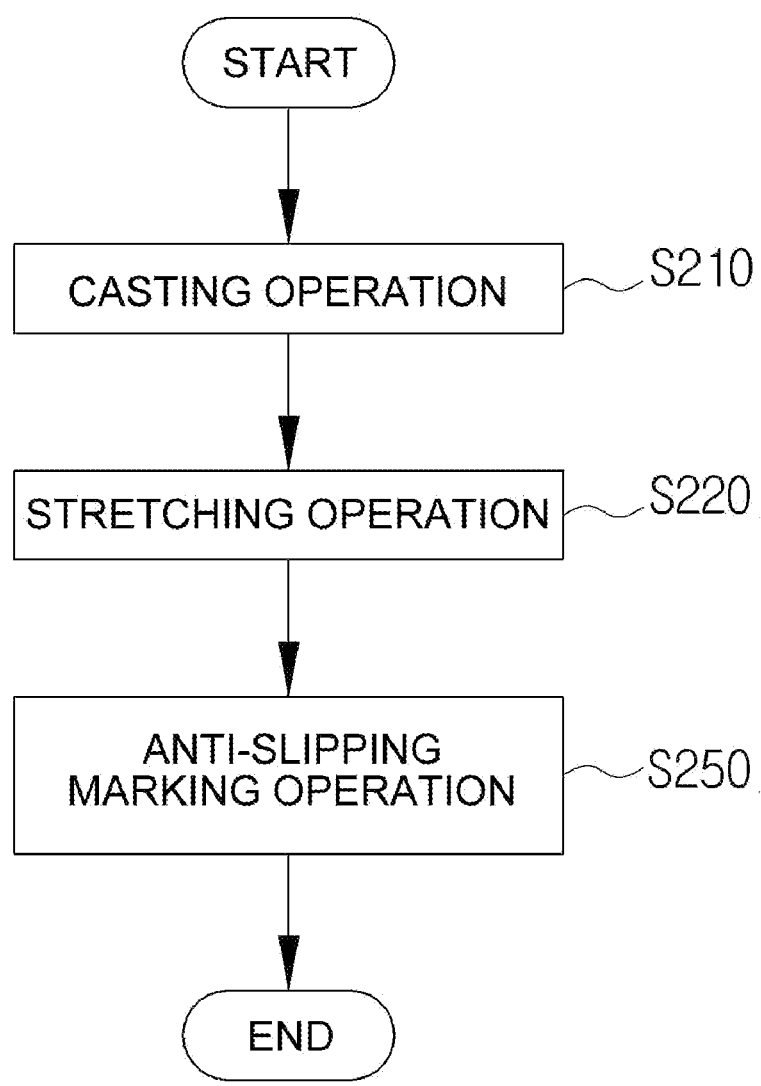
FIG. 10 is a flow chart of a fourth exemplary embodiment of the present invention.

Here, in the case of the fifth embodiment shown in FIG. 10, the anti-slipping marking operation (S250) may include a first anti-slipping marking operation (S251) of forming anti-slipping mark parts F30 at predetermined parts of the left and right sides of the stretched film between the stretch operation (S220) and the drying operation (S240) and a second anti-slipping marking operation (S252) of forming anti-slipping mark parts F30 at predetermined parts of the left and right sides of the stretched film after the drying operation (S240).

That is, according to the fifth embodiment of the present invention, the anti-slipping mark part F30 formed through the first marking operation (S251) includes marks F21 and F22 formed by a left joint Cl and a right joint Cr.

Therefore, according to the fifth embodiment of the present invention, the marking operation (S250) may prevent the film from being damaged when the film slips while winding the film (S260), prevent a black belt from being generated after winding the film, and enable the film to be wound in large quantities while winding.

Figure 12:
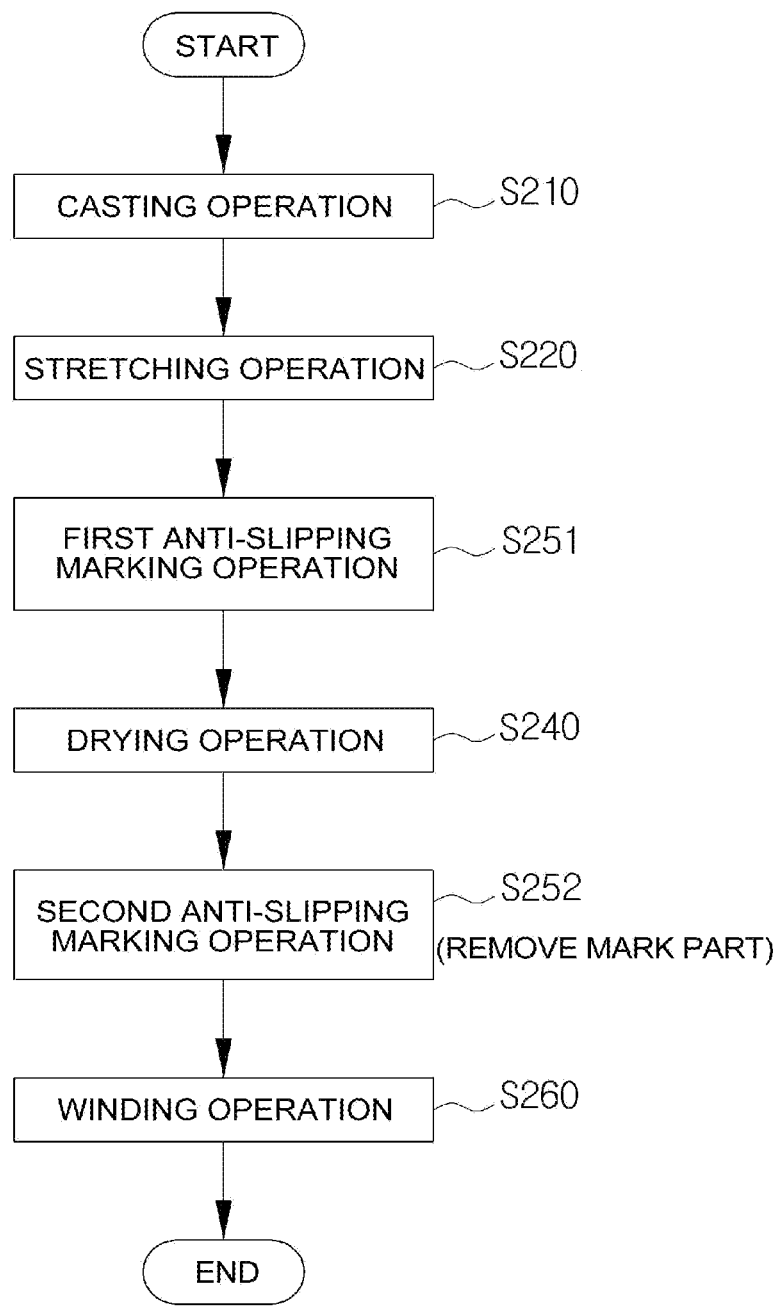
FIG. 12 is a flow chart of a sixth exemplary embodiment of the present invention.

The sixth embodiment relates to another example of a method for manufacturing a wide film according to the present invention (See FIG. 12).

A casting operation (S210), and a stretch operation (S220), a dry operation (S240), and an anti-slipping marking operation (S250) (a first anti-slipping marking operation (S251) and a second anti-slipping marking operation (S252)) are the same operations as those in the fifth embodiment, and a description thereof will be omitted.

However, according to the sixth embodiment of the present invention, in the second anti-slipping marking operation (S252), the case in which regions at which marks of left and right sides of a film are formed include marks F21 and F22 formed by a left joint Cl and a right joint Cr is described.

Figure 13:
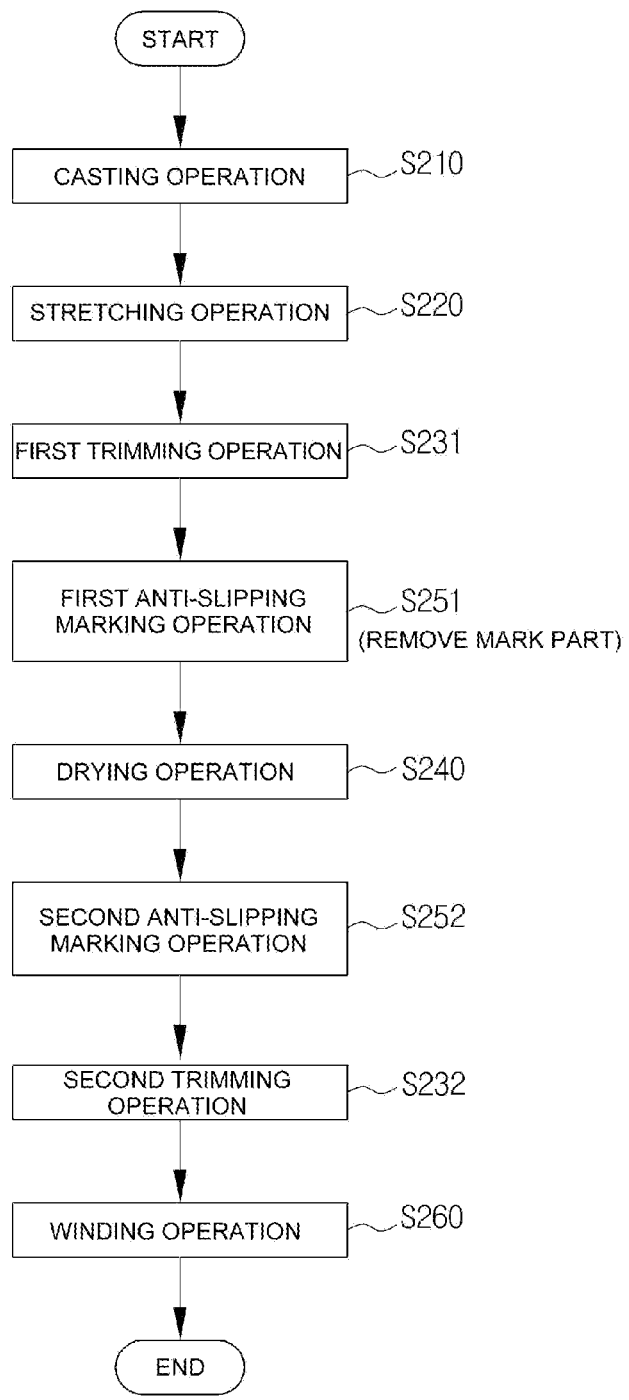
FIG. 13 is a flow chart of a seventh exemplary embodiment of the present invention.

The seventh embodiment relates to another example of a method for manufacturing a wide film according to the present invention (See FIG. 13).

A casting operation (S210), and a stretch operation (S220), and a dry operation (S240) are the same operations as those in the second embodiment, and a description thereof will be omitted. The method for manufacturing a wide film according to the seventh embodiment of the present invention further include a first trimming operation (S231), a second trimming operation (S232), an anti-slipping marking operation (S250) (a first anti-slipping marking operation (S251) and a second anti-slipping marking operation (S252)), and a winding operation (S260).

Here, in the case of the seventh embodiment shown in FIG. 13, the anti-slipping marking operation (S250) may include a first anti-slipping marking operation (S251) performed between the first trimming operation (S231) and the drying operation (S240) and a second anti-slipping marking operation (S252) performed between the drying operation (S240) and the second trimming operation (S232). Here, the anti-blocking mark part F30 formed through the first anti-slipping marking operation (S251) includes marks F21 and F22 formed by a left joint Cl and a right joint Cr.

Figure 14:
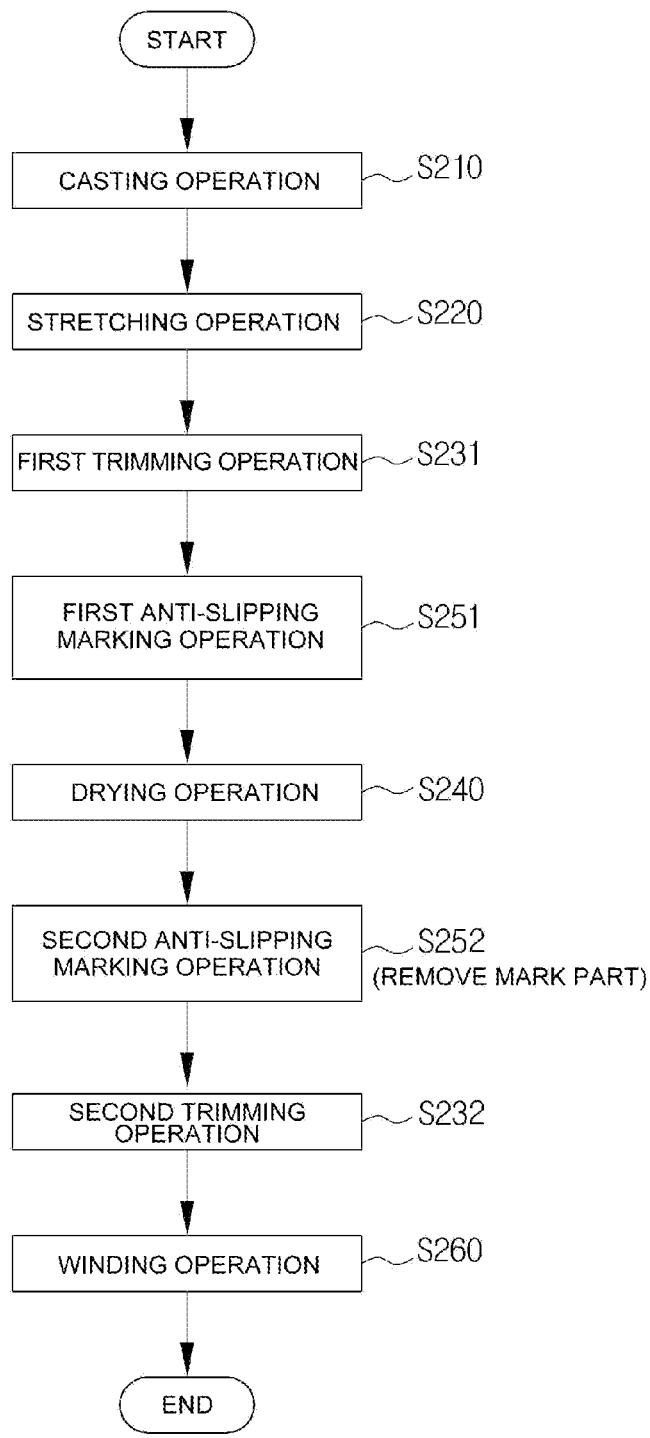
FIG. 14 is a flow chart of an eighth exemplary embodiment of the present invention.

An eighth embodiment of the present invention has the same process order as that of the seventh embodiment of the present invention, but the anti-slipping mark part F30 formed through the second anti-slipping marking operation (S252) includes marks F21 and F22 formed by a left joint Cl and a right joint Cr (See FIG. 14).

Figure 15:
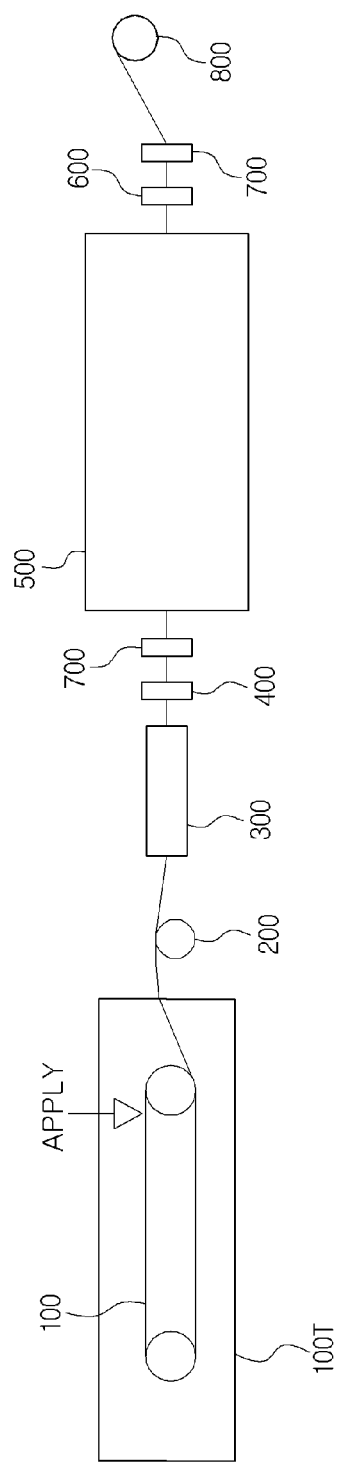
FIG. 15 is a configuration diagram of an apparatus for performing seventh and eighth exemplary embodiments of the present invention.

FIG. 15 is a configuration diagram of an apparatus for performing seventh and eighth exemplary embodiments of the present invention. Here, in the casting operation S210, a gel type film is formed using a caster 100T.

The film formed in the casting operation S210 is stripped off from the wide casting belt 100 by a stripping roller 200. A solvent residue may be controlled during stripping, and may be in the range of 20 to 40 wt %.

A tenter 300 is an apparatus for performing a stretching operation (S220), a first trimmer 400 is an apparatus for performing a first trimming operation (S231), a marking press 700 disposed at a back portion of the first trimmer 400 is an apparatus for performing a first anti-slipping marking operation (S251), a dryer 500 is an apparatus for performing a drying operation (S240), a second trimmer 600 is an apparatus for performing a second trimming operation (S232), and a marking press 700 disposed at a back portion of the second trimmer 600 is an apparatus for performing a second anti-slipping marking operating (S252).

A winding roller 800 is a component around which a final wide film F is wound in a winding operation (S260).

Figure 16:
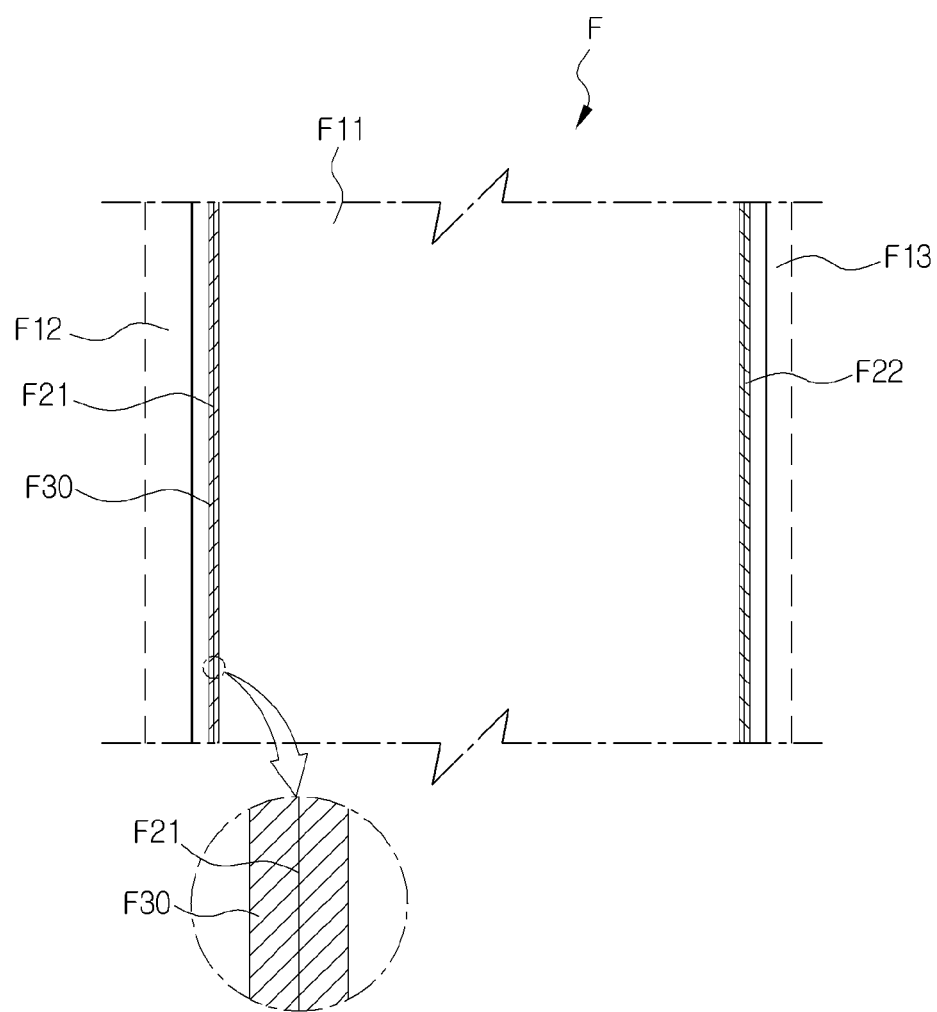
FIG. 16 is a schematic view of a film obtained from a second anti-slipping marking operation according to the present invention.
Figure 17:
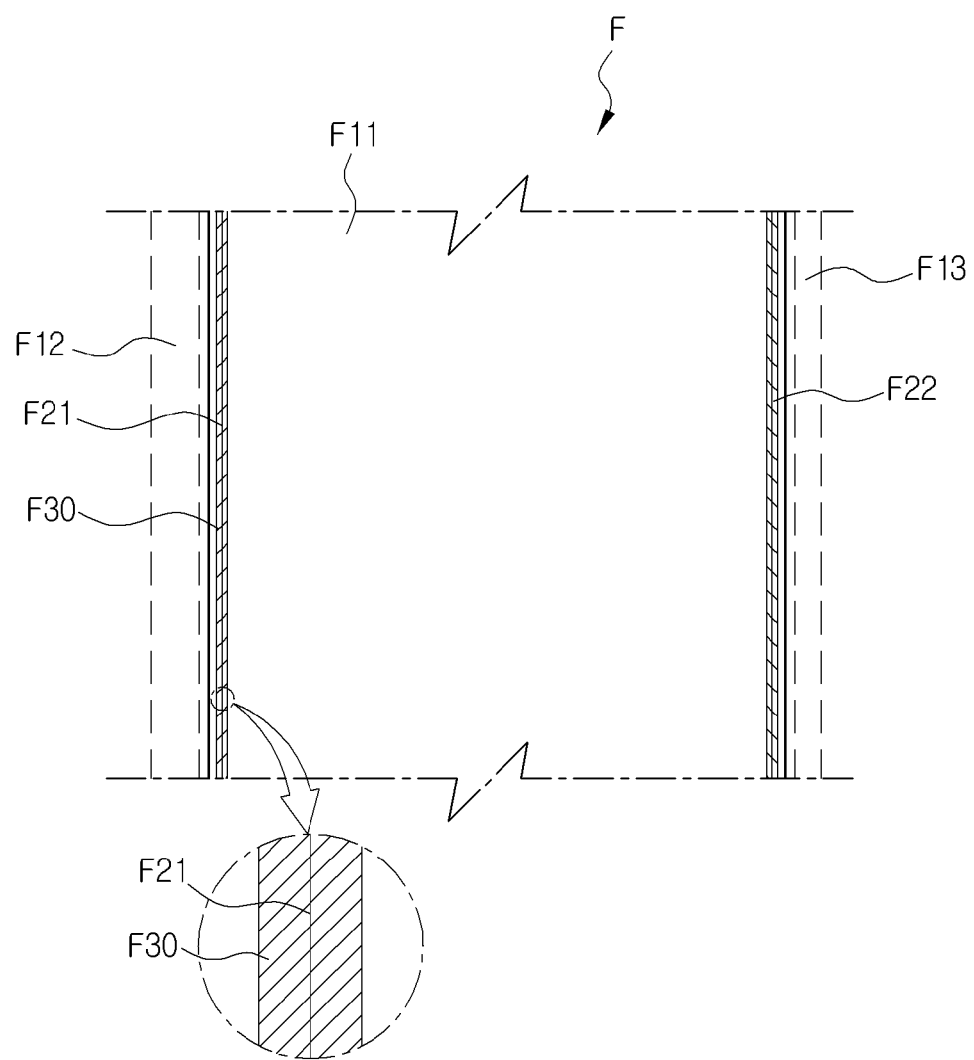
FIG. 17 is a schematic view of a film obtained from a second trimming operation according to the present invention.

Meanwhile, FIGS. 16 and 17 are schematic views of a film on which a removing operation is performed in an anti-slipping marking operation (S250), wherein FIG. 16 shows the film after the anti-slipping marking operation (S250), and FIG. 17 shows the film after the trimming operation (S232).

Referring to FIG. 16, in the anti-slipping marking operation, a region at which an anti-slipping mark part F30 is formed includes regions at which a left joint Cl and right joint Cr.

A state of the film in which the casting operation (S210) or the casting operation (S220) is completed and a state of the film in which the first trimming operation (S231) is completed are shown as a dotted line, and a state of film in which the second trimming operation (S232) is shown as a dark straight line in FIG. 17.

Although not shown, a method for manufacturing a wide film according to another embodiment of the present invention includes a casting operation (S210), a stretching operation (S220), a first trimming operation (S231), a first anti-slipping marking operation (S251), a drying operation (S240), a second marking operation (S252), a second trimming operation (S2320), and winding operation (S260) as shown in FIGS. 13 and 14. In this case, marks F21 and F22 formed by a left joint Cl and a right joint Cr may be trimmed in the first or second trimming operations (S231 or S232).

In addition, a wide film according to the present invention may be manufactured by only the method of the above-mentioned embodiments, but a method for manufacturing a wide film according to the present invention may further include other additional operations.

Particularly, in the first to third embodiments of the present invention, an anti-slipping marking operation may be additionally performed, or in the fourth to sixth embodiments, a trimming operation may be further performed.

A wide belt according to the present invention is manufactured according to the method for manufacturing a wide film as described above.

In this case, a portion of the wide film F manufactured by being casted between the left joint Cl and a right joint Cr has a width of 1500 mm or more.

When a stretching rate is increased in order to increase the width of the finally manufactured film, it may be difficult to control intrafacial retardation Re and facial retardation Rth. However, according to the present invention, since the film having a required width may be manufactured even the case of decreasing the stretching rate, the wide film F may easily control the intrafacial retardation Re and the facial retardation Rth.

Further, the wide film F may have a thickness of 40 to 80 μm.

Therefore, with the method for manufacturing a wide film and the wide film according to the present embodiment of the present invention, the wide film F that does not include the mark part caused by welding the casting belt 100 may be manufactured.

The present invention is not limited to the above-mentioned exemplary embodiments, and may be variously applied, and may be variously modified without departing from the gist of the present invention claimed in the claims.

What is claimed is:

1. A method for manufacturing a wide film, comprising:
a casting operation which is a process of casting a film using a wide casting belt including a central belt, a left belt having a right end formed integrally with a left end of the central belt through a left joint in a length direction of the central belt, and a right belt having a left end formed integrally with a right end of the central belt through a right joint in the length direction of the central belt;
a stretching operation which is a process of gripping predetermined regions of left and right sides of the cast film stripped off from the wide casting belt and stretching the cast film using a tenter so that the cast film is extended in a width direction thereof;
a first trimming operation which is a process of removing parts of left and right sides of the stretched film including regions at which marks are formed by the left joint and the right joint of the wide casting belt after the stretching operation;
a drying operation which is a process of drying the trimmed film after the first trimming operation; and
a second trimming operation which is a process of removing predetermined parts of left and right sides of the dried film after the drying operation.

2. The method of claim 1, further comprising:
an anti-slipping marking operation which is a process of marking predetermined parts of the left and right sides of the stretched film to form anti-slipping mark parts; and
a winding operation which is a process of winding the dried film having the anti-slipping mark parts formed therein.

3. The method of claim 2, wherein the anti-slipping marking operation includes:
a first anti-slipping marking operation which is a process of forming anti-slipping mark parts at predetermined parts of left and right sides of the stretched film, between the stretching operation and the drying operation; and a second anti-slipping marking operation which is a process of forming anti-slipping mark parts at predetermined parts of left and right sides of the dried film after the drying operation.

4. The method of claim 3, wherein the first trimming operation is carried out between the stretching operation and the first anti-slipping marking operation.

5. The method of claim 1, wherein in the casting operation,
dope containing cellulose triacetate solution is used,
the dope includes a solvent such as methylene chloride and methanol and a plasticizer, other than the cellulose triacetate, and
the dope has a solid content comprising the cellulose triacetate and the plasticizer of 15 to 25 wt. %, and a mixing ratio of the solvents, that is, methylene chloride and methanol ranges from 80 to 95 wt. % and 5 to 20 wt. %, respectively, while the plasticizer is contained in an amount of 5 to 20 wt. %, based on 100 wt. % of the cellulose triacetate.

6. The method of claim 1, wherein the central belt has a width of 1200 to 1500 mm, and the left and right belts have a width of 300 to 500 mm.

7. The method of claim 1, wherein the central belt has a central belt joint, the left belt has a left belt joint, and the right belt has a right belt joint, and wherein the central belt joint, the left belt joint and the right belt joint are positioned on a same straight line.

8. The method of claim 7, wherein the left joint, the right joint, the central belt joint, the left belt joint, and the right belt joint are formed by welding.

9. A method for manufacturing a wide film, comprising:
a casting operation which is a process of casting a film using a wide casting belt including a central belt, a left belt having a right end formed integrally with a left end of the central belt through a left joint in a length direction of the central belt, and a right belt having a left end formed integrally with a right end of the central belt through a right joint in the length direction of the central belt;
a stretching operation which is a process of gripping and stretching predetermined regions of left and right sides of the cast film stripped off from the wide casting belt using a tenter so that the cast film is extended in a width direction thereof;
a first trimming operation which is a process of removing predetermined parts of left and right sides of the film excluding regions at which marks are formed by the left joint and the right joint of the wide casting belt after the stretching operation;
a drying operation which is a process of drying the trimmed film after the first trimming operation; and
a second trimming operation which is a process of removing parts of left and right sides of the dried film including regions at which mark are formed by the left joint and right joint of the wide casing belt after the drying operation.

10. The method of claim 9, further comprising:
an anti-slipping marking operation which is a process of marking predetermined parts of the left and right sides of the stretched film to form anti-slipping mark parts; and
a winding operation which is a process of winding the film having the anti-slipping mark parts formed therein.

11. The method of claim 10, wherein the anti-slipping marking operation includes:

a first anti-slipping marking operation which is a process of forming anti-slipping mark parts at predetermined parts of left and right sides of the stretched film between the stretching operation and the drying operation; and a second anti-slipping marking operation which is a process of forming anti-slipping mark parts at predetermined parts of the left and right sides of the dried film, after the drying operation.

12. The method of claim 11, wherein the first trimming operation is carried out between the stretching operation and the first anti-slipping marking operation.

13. The method of claim 9, wherein in the casting operation, dope containing cellulose triacetate is used, the dope includes a solvent such as methylene chloride and methanol and a plasticizer, other than the cellulose triacetate, and the dope has a solid content comprising the cellulose triacetate and the plasticizer of 15 to 25 wt. %, and a mixing ratio of the solvents, that is, methylene chloride and methanol ranges from 80 to 95 wt. % and 5 to 20 wt. %, respectively, while the plasticizer is contained in an amount of 5 to 20 wt. %, based on 100 wt. % of the cellulose triacetate.

14. The method of claim 9, wherein in the wide casting belt, the central belt has a width of 1200 to 1500 mm, and the left and right belts have a width of 300 to 500 mm.

15. The method of claim 9, wherein the central belt has a central belt joint, the left belt has a left belt joint, and the right belt has a right belt joint, wherein the central belt joint, the left belt joint and the right joint belt are positioned on a same straight line.

16. The method of claim 15, wherein the left joint, the right joint, the central belt joint, the left belt joint, and the right belt joint are formed by welding.

* * * * *